United States Patent
Jeon (10) Patent No.: US 10,760,171 B2
(45) Date of Patent: Sep. 1, 2020

(54) OXYGEN GENERATOR INTEGRATED WITH OZONE REMOVAL FILTER

(71) Applicant: FOURL DESIGN CO. LTD., Gyeonggi-do (KR)

(72) Inventor: Sok Ho Jeon, Gyeonggi-do (KR)

(73) Assignee: FOURL DESIGN CO. LTD., Gyeonggi-do (KR)

( * ) Notice: Subject to any disclaimer, the term of this patent is extended or adjusted under 35 U.S.C. 154(b) by 39 days.

(21) Appl. No.: 15/746,864

(22) PCT Filed: Jul. 27, 2016

(86) PCT No.: PCT/KR2016/008242
§ 371 (c)(1),
(2) Date: Jan. 23, 2018

(87) PCT Pub. No.: WO2017/018809
PCT Pub. Date: Feb. 2, 2017

(65) Prior Publication Data
US 2019/0024249 A1    Jan. 24, 2019

(30) Foreign Application Priority Data
Jul. 28, 2015    (KR) .................... 10-2015-0106571

(51) Int. Cl.
*C25B 1/04*    (2006.01)
*C25B 9/00*    (2006.01)
(Continued)

(52) U.S. Cl.
CPC .......... *C25B 15/08* (2013.01); *B01D 53/0407* (2013.01); *C25B 1/06* (2013.01);
(Continued)

(58) Field of Classification Search
CPC .... C25B 1/04; C25B 9/00; C25B 1/02; C25B 1/13; C25B 9/04
(Continued)

(56) References Cited

U.S. PATENT DOCUMENTS

2009/0092869 A1    4/2009    Chae et al.
2013/0056350 A1    3/2013    Sin
(Continued)

FOREIGN PATENT DOCUMENTS

CN    2878411 Y    3/2007
CN    201163101 Y    12/2008
(Continued)

*Primary Examiner* — Zulmariam Mendez
(74) *Attorney, Agent, or Firm* — IP Legal Services, LLC (57) ABSTRACT

The present invention relates to an oxygen generator integrated with an ozone removal filter such that an ozone removal filter is provided in an oxygen discharge opening communicating with an oxygen discharge hole of a water electrolytic cell constituting an apparatus for producing oxygen by using mineral water among generally used water, for filtering ozone generated with oxygen during electrolysis of water and ozone compounds, in which ozone is combined with various organic and inorganic materials contained in mineral water, such as calcium (Ca), magnesium (Mg) and silicon (Si), and thus the oxygen generator allows only high purity oxygen to pass through and to be discharged through the oxygen discharge hole.

1 Claim, 10 Drawing Sheets

(51) Int. Cl.
- *C25B 9/04* (2006.01)
- *C25B 1/13* (2006.01)
- *C25B 15/08* (2006.01)
- *C25B 1/10* (2006.01)
- *C25B 9/08* (2006.01)
- *B01D 53/04* (2006.01)
- *C25B 1/06* (2006.01)

(52) U.S. Cl.
CPC .................. *C25B 1/10* (2013.01); *C25B 9/08* (2013.01); *B01D 2253/102* (2013.01); *B01D 2256/12* (2013.01); *B01D 2257/106* (2013.01); *B01D 2259/4533* (2013.01); *Y02E 60/366* (2013.01)

(58) Field of Classification Search
USPC ....................................................... 204/276
See application file for complete search history.

(56) References Cited

U.S. PATENT DOCUMENTS

| | | | |
|---|---|---|---|
| 2013/0062196 A1 | 3/2013 | Sin | |
| 2015/0343336 A1* | 12/2015 | Mackay Pett | B01D 24/4636 |
| | | | 502/22 |

FOREIGN PATENT DOCUMENTS

| | | |
|---|---|---|
| CN | 101555049 A | 10/2009 |
| CN | 203360586 U | 12/2013 |
| JP | 09-155158 A | 6/1997 |
| JP | 11-106976 A | 4/1999 |
| JP | 2000-248392 A | 9/2000 |
| JP | 2009-091650 A | 4/2009 |
| JP | 2013-522022 A | 6/2013 |
| JP | 2013-522023 A | 6/2013 |
| KR | 10-2006-0045714 A | 5/2006 |
| KR | 20-0439134 Y1 | 3/2008 |
| KR | 10-1090121 B1 | 12/2011 |

\* cited by examiner

OXYGEN GENERATOR INTEGRATED WITH OZONE REMOVAL FILTER

CROSS REFERENCE TO RELATED APPLICATIONS

This application is a National Stage Patent Application of PCT International Patent Application No. PCT/KR2016/008242 (filed on Jul. 27, 2016) under 35 U.S.C. § 371, which claims priority to Korean Patent Application No. 10-2015-0106571 (filed on Jul. 28, 2015), the teachings of which are incorporated herein in their entireties by reference.

TECHNICAL FIELD

The present invention relates to an oxygen generator integrated with an ozone removal filter. More particularly, the present invention relates to an oxygen generator integrated with an ozone removal filter in which the oxygen generator produces oxygen by electrolyzing water without using an electrolyte, additives, or the like, thereby ensuring convenient operation, no noise generation, high efficiency, low power consumption, safe and easy management due to nonuse of an electrolyte such as alkali, and compact appearance of an electrolytic cell which is included in the oxygen generator, and generates oxygen by using water. A filter mounting portion is integrally provided in an oxygen discharge opening, which communicates with an oxygen discharge hole and is provided on a detachable or an integrated upper cover of the electrolytic cell, and an ozone removal filter is seated in the filter mounting portion such that ozone generated with oxygen during electrolysis of supplied mineral water and ozone compounds, in which ozone is combined with various organic and inorganic materials contained in the mineral water such as calcium (Ca), magnesium (Mg), and silicon (Si), etc., are efficiently filtered by the ozone removal filter, thereby being capable of supplying high purity oxygen in a hygienic manner. In addition, since it is not necessary to provide a separate external filter, the configuration of the present invention is simple and a product is capable of being further miniaturized.

BACKGROUND ART

Oxygen is inhaled into a human body through respiration and then supplied to each organ of the human body by means of blood. The supplied oxygen is consumed for brain activities and kinetic energy.

Oxygen consumption in a living body is significantly different in each organ. As an example, the brain consumes more oxygen than muscle.

Among all viscera and organs, the brain consuming a largest amount of oxygen has a weight of merely 1.4 kg, which is just 2% of the body weight, but it consumes about 25% of total oxygen consumption of the entire body.

Since the brain does not have a material such as 'myoglobin' capable of keeping oxygen at some extent as muscle, the brain immediately consumes all of the supplied oxygen.

If inhaled air has no oxygen, a partial pressure of oxygen required by pulmonary blood does not occur and thus there may be a risk that just one breath of oxygen-free air causes loss of consciousness.

Oxygen performs oxidization in a human body and helps resist infectious microbes and pathogens. A human being cannot live unless oxygen is continuously supplied to every cell of the body. This action is made by the heart and a pair of lungs. The pair of lungs has about seven hundred million alveoli to supply oxygen to blood and the blood is supplied to everywhere of the human body by means of a pumping action of the heart.

The blood of most modern people are acidified due to lack of exercises and intake of harmful food, and cholesterol adheres to blood vessel such that disturbs the flow of blood, which becomes a source of all adult diseases. However, weakened functions of the human body can be effectively recovered through supply of fresh oxygen.

As an example of an oxygenated mineral water generator for producing mineral water containing a large amount of oxygen, there is "oxygenated mineral water generator" disclosed in Korean Patent Application No. 10-2003-0034755, which is owned by the present inventor.

In the oxygenated mineral water generator, oxygen is produced by an oxygen generator using three methods, i.e., a PSA method, a membrane method, and a flat sheet membrane method, and then oxygen is rapidly dissolved in mineral water to produce oxygenated mineral water.

However, the conventional oxygenated mineral water generator mentioned above has a complicated oxygen generating process and moisture generated when a compressor sucks, compresses, and then supplies air to a nozzle affects zeolite existing in the nozzle, resulting in abrupt deterioration of oxygen purity when oxygen is generated. In addition, noise and vibration generated from the compressor may cause stress to a user and disturb sleep, and bacteria may propagate therein.

Recently, an oxygen generating apparatus using electrolysis has been developed and used. However, since the apparatus uses an alkaline electrolyte solution, it has disadvantages in that much attention should be paid to handling thereof and a safety problem may occur.

Therefore, in an effort to solve such problems, there is "apparatus for producing oxygen using water" disclosed in Korean Patent Application No. 10-2005-0031091, which is owned by the present inventor. The conventional apparatus produces high purity oxygen by electrolyzing mineral water without using an electrolyte, additives or the like, thereby ensuring convenient operation, no noise generation, high efficiency, low power consumption, a compact appearance, and safe and easy management due to nonuse of an electrolyte such as alkali.

Although the related art has such advantages, it has a problem that ozone ($O_3$) is generated at a positive electrode plate in a small amount in addition with oxygen generated at a negative electrode plate and is discharged outside. Ozone ($O_3$) is a pure allotrope of oxygen but unstably produced from reaction of dioxygen ($O_2$) and atomic oxygen (O), and has molecular weight of 48 g/mol, boiling point of −112° C., and specific gravity of 1.67.

Ozone has some benefits for protecting living things from harmful ultraviolet radiation, degrading pesticides and heavy metals, sterilizing, deodorizing, and air purifying, and the like. On the other hand, repeated exposure to ozone causes irreversible damage to the lungs. Even a low concentration of ozone cause variety health problems such as chest pain, cough, nausea, throat irritation, and hyperemia when inhaled. In addition, ozone aggravates bronchitis, heart disease, lung cancer, asthma, and reduces lung capacity.

Ozone is an oxidant and acts as a strong stimulus source for respiratory organs. Therefore, organs that are primarily affected when exposed to ozone are respiratory organs and the organs that are most affected by ozone are also the respiratory organs. It is known that ozone in the atmosphere causes or worsens symptoms of patients with chronic respiratory diseases.

Among chronic respiratory diseases, asthma is most problematic in which severe symptoms are caused by temporary stimulation.

Ozone also affects the central nervous system, leading to various changes in the symptoms and behaviors associated therewith.

Thus, when exposed to high concentration of ozone, symptoms of the nervous system such as headache and unconsciousness may occur.

Further, ozone stimulates a sensitive part of the human body and causes stimulation symptoms due to pungency thereof.

Effects of ozone stimulation are first exhibited in senses that accept stimuli such as eyes and nose.

Whether ozone has carcinogenicity has not yet been proven experimentally. In addition, it is difficult to directly deduce the relationship between ozone and cancer development because it is difficult to separate the influence of ozone separately from epidemiological studies. However, ozone is known to denature proteins constituting the human body, react with unsaturated fatty acids constituting the membrane of the human body, leading to cause toxicity and damage cells.

Thus, it was necessary to efficiently filter ozone generated during electrolysis of mineral water and ozone compounds, which are combined with ozone and various organic and inorganic materials such as calcium (Ca), magnesium (Mg), and silicon (Si), etc., by an ozone removal filter.

DISCLOSURE

Technical Problem

Accordingly, the present invention has been made keeping in mind the above problems occurring in the related art, and an object of the present invention is to provide an oxygen generator integrated with an ozone removal filter configured to improve the "apparatus for producing oxygen using water" disclosed in Korean Patent Application No. 10-2005-0031091, which is owned by the present inventor, and an oxygen generator of the present invention includes a water electrolytic cell constituting an apparatus for producing oxygen by using mineral water among generally used water, a filter mounting portion integrally provided in an oxygen discharge opening which is provided in the water electrolytic cell and communicates with an oxygen discharge hole, an ozone removal filter seated in the filter mounting portion to filter ozone generated with oxygen during electrolysis of mineral water and ozone compounds, in which ozone is combined with various organic and inorganic materials contained in the mineral water such as calcium (Ca), magnesium (Mg), and silicon (Si), etc., and thus the oxygen generator allows only high purity oxygen to pass through and to be discharged through the oxygen discharge hole, thereby protecting human body from toxicity mechanism of the ozone and ozone compounds and manufacturing high purity oxygen safely such that it is possible to be widely utilized for various purposes such as in drinking water containing oxygen.

Technical Solution

In order to accomplish the above and other objects, an oxygen generator integrated with an ozone removal filter is provided, in which the oxygen generator is configured to generate oxygen by electrolysis of water and including: a water electrolytic cell having a detachable or integrated upper cover provided with an oxygen discharge opening communicating with an oxygen discharge hole; a filter mounting portion integrally provided in the oxygen discharge opening of the detachable or integrated upper cover of the water electrolytic cell and provided with a through hole; and an ozone removal filter seated in the filter mounting portion, wherein ozone generated with oxygen during electrolysis of water supplied into the water electrolytic cell through a water supply hole and ozone compounds, in which ozone is combined with various organic and inorganic materials contained in the water such as calcium (Ca), magnesium (Mg), and silicon (Si), etc., are supplied to the ozone removal filter seated in the filter mounting portion through the through hole, filtered by the ozone removal filter, and then discharged through the oxygen discharge hole, thereby obtaining high purity oxygen safely.

Advantageous Effects

According to the present invention, the oxygen generator integrated with the ozone removal filter produces oxygen by electrolyzing mineral water without using an electrolyte, additives, or the like, thereby ensuring ease of use, convenient operation, no noise generation, low power consumption, compact appearance, and safe and easy management due to nonuse of an electrolyte such as alkali.

In addition, the filter mounting portion is integrally provided in the oxygen discharge opening, which is provided in the upper cover of the water electrolytic cell and communicates with the oxygen discharge hole, and the ozone removal filter is seated in the filter mounting portion such that ozone generated with oxygen during electrolysis of the supplied mineral water and ozone compounds, in which ozone is combined with various organic and inorganic materials contained in the mineral water such as calcium (Ca), magnesium (Mg), and silicon (Si), etc., are filtered by the ozone removal filter, thereby being capable of supplying high purity oxygen safely in a hygienic manner and being utilized for various purposes such as in beverages containing oxygen.

In addition, since a separate external filter is not necessary to be provided, the configuration is simple and the product is capable of being further miniaturized.

DESCRIPTION OF DRAWINGS

FIGS. 1 to 5 are diagrams showing an embodiment of the present invention, in which:

FIGS. 6 to 10 are diagrams showing another embodiment of the present invention,

BEST MODE

An oxygen generator integrated with an ozone removal filter, the oxygen generator being configured to generate oxygen by electrolysis of water and comprising: a water electrolytic cell having a detachable or integrated upper cover provided with an oxygen discharge opening communicating with an oxygen discharge hole; a filter mounting portion integrally provided in the oxygen discharge opening of the detachable or integrated upper cover of the water electrolytic cell as a recessed groove form, the filter mounting portion being provided with a through hole and being configured such that an upper portion thereof is opened; an ozone removal filter seated in the filter mounting portion, the ozone removal filter being selected from the group consisting of a carbon block filter, activated carbon particles, and an activated carbon nonwoven fabric in which an active carbon is attached to a nonwoven fabric, and being covered with a silicon film; and a cap body having the oxygen discharge hole and covering an upper portion of the filter mounting portion to seal an upper portion of the ozone removal filter, thereby mounting the ozone removal filter in the filter mounting portion, wherein ozone generated with oxygen during electrolysis of water supplied into the water electrolytic cell through a water supply hole and ozone compounds, in which ozone is combined with various organic and inorganic materials contained in the water such as calcium (Ca), magnesium (Mg), and silicon (Si), etc., are supplied to the ozone removal filter that is covered with the silicon film and is seated in the filter mounting portion through the through hole provided in the filter mounting portion of the detachable or integrated upper cover filtered by the ozone removal filter, and then discharged through the oxygen discharge hole provided at the cap body covering the upper portion of the filter mounting portion, thereby obtaining high purity oxygen safely.

Hereinafter, an embodiment of the present invention will be described with reference to the accompanying drawings. It should be understood that the embodiment of the present invention may be changed to a variety of embodiments and the scope and spirit of the present invention are not limited to the embodiment described hereinbelow. It is to be noted that, when the functions of conventional elements and the detailed description of elements related with the present invention may make the gist of the present invention unclear, a detailed description of those elements will be omitted. In addition, it should be understood that the shape and size of the elements shown in the drawings may be exaggeratedly drawn to provide an easily understood description of the structure of the present invention.

Figure 1:
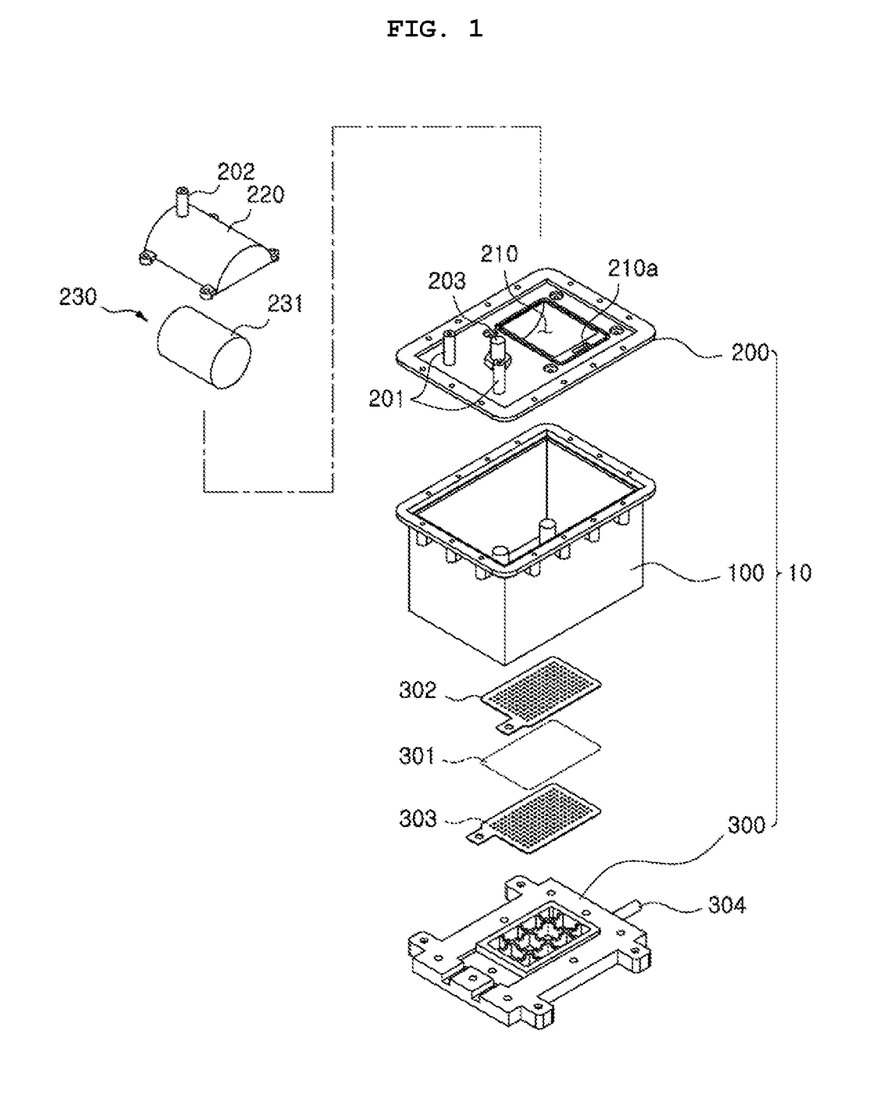
FIG. 1 is an overall exploded perspective view.
Figure 2:
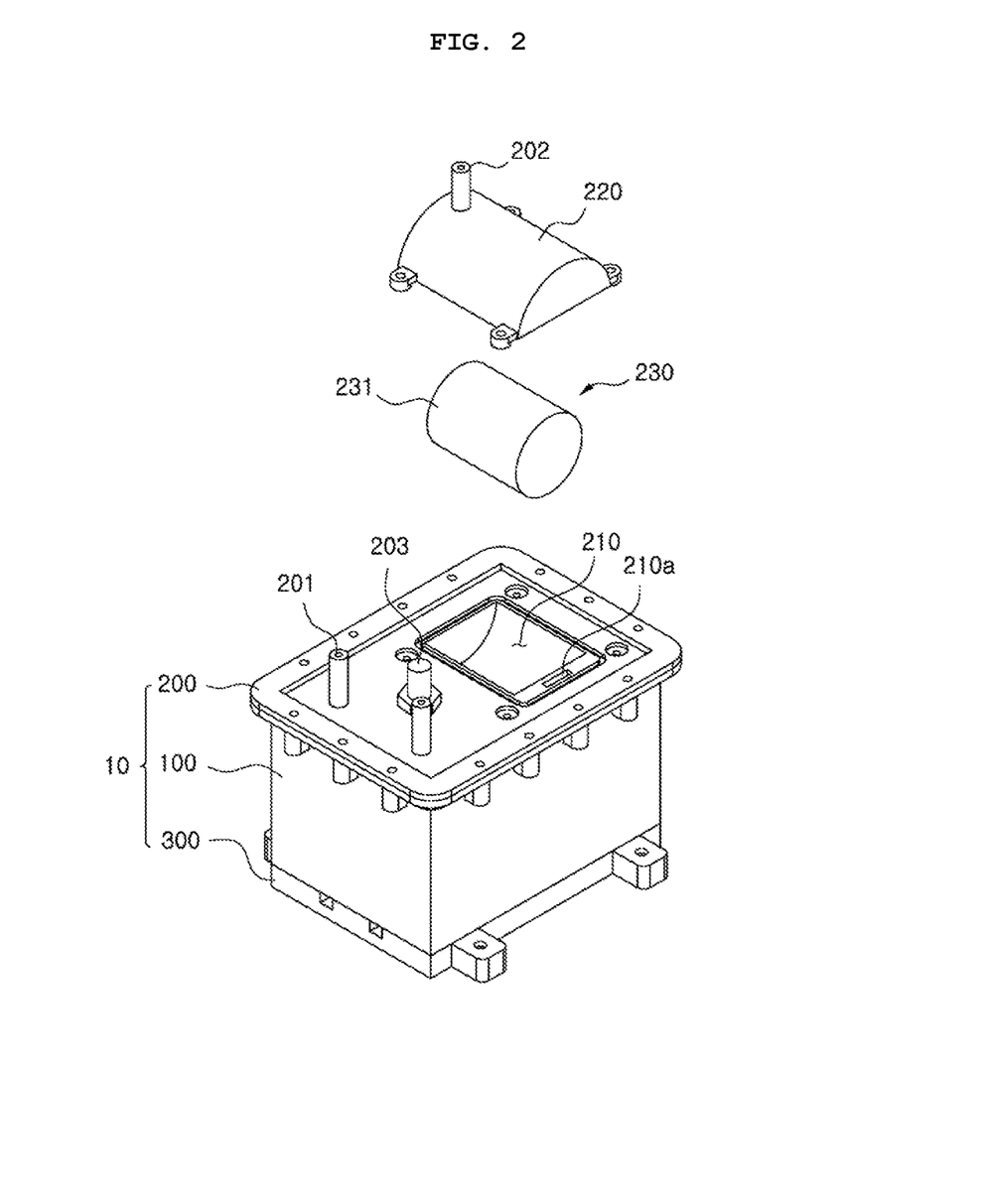
FIG. 2 is an exploded perspective view of an essential part.
Figure 3:
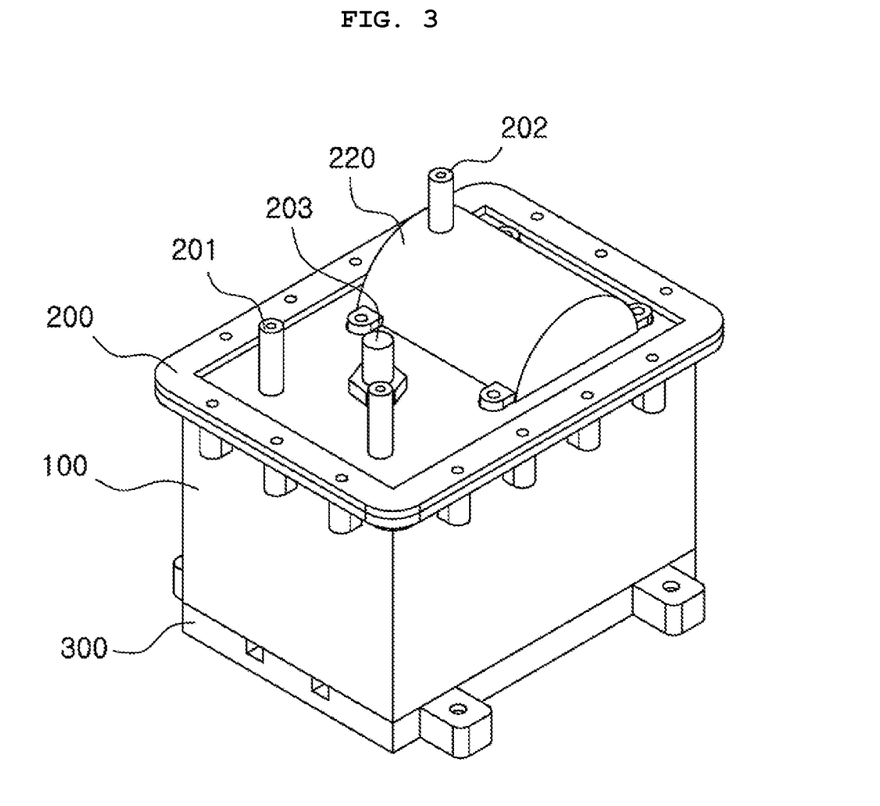
FIG. 3 is an assembled perspective view.
Figure 4:
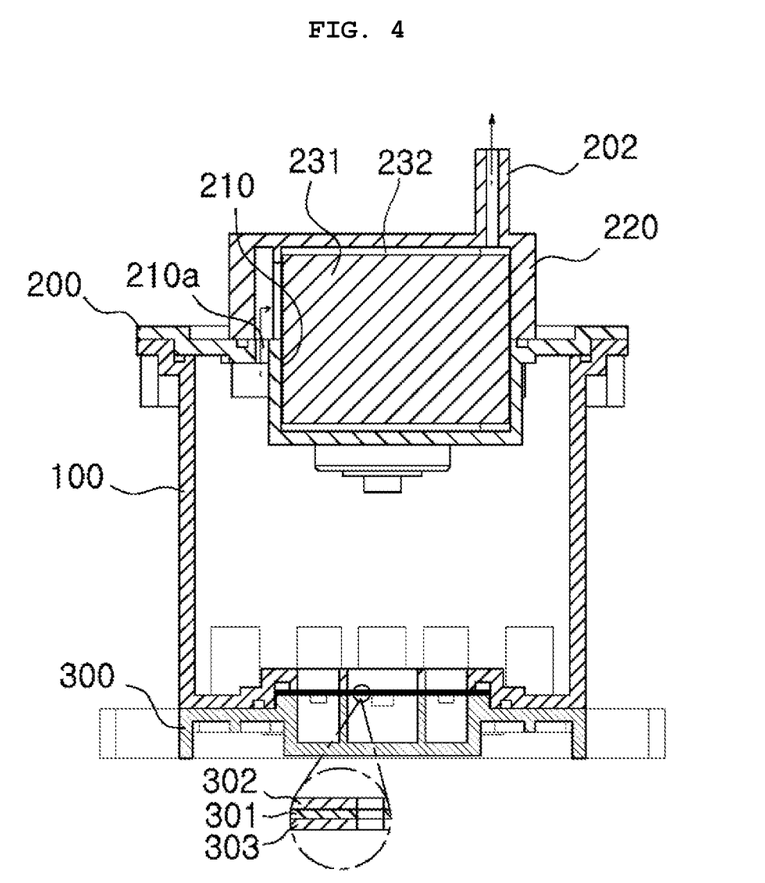
FIG. 4 is an exemplary front cross-sectional view.
Figure 5:
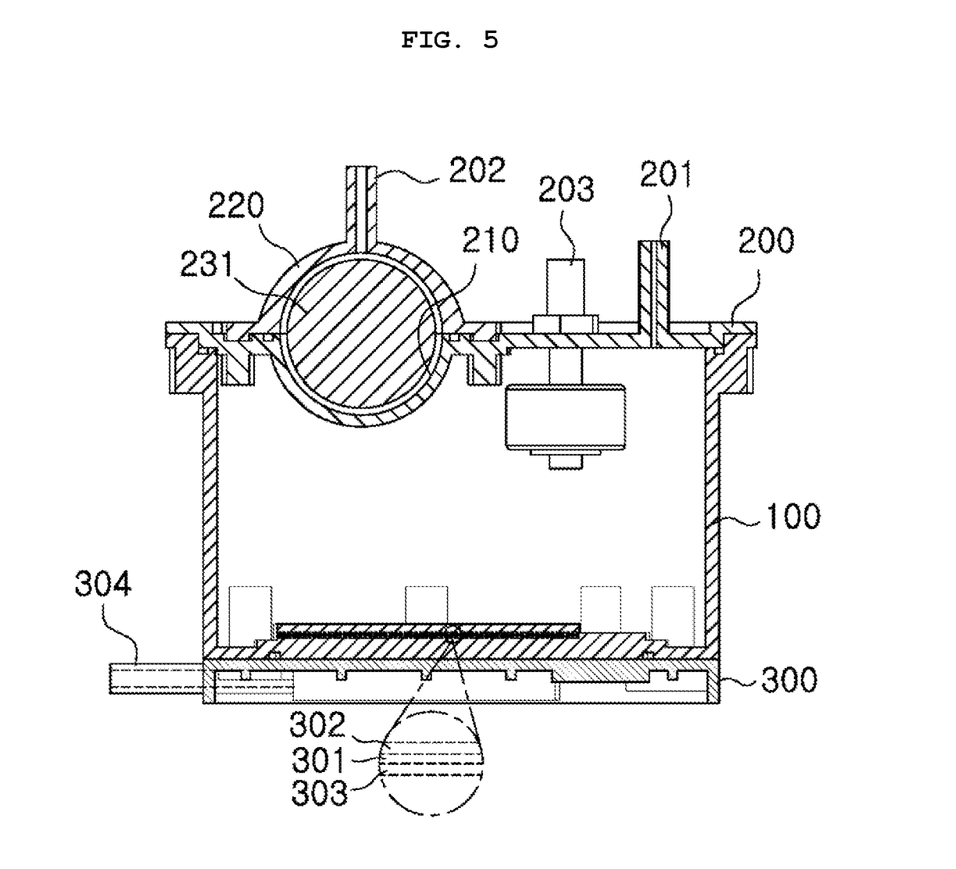
FIG. 5 is an exemplary side cross-sectional view.

As shown in FIGS. 1 to 5, a water electrolytic cell 10 included in an oxygen generator integrated with the ozone removal filter of an embodiment of the present invention roughly includes a container body 100 provided in a form of a container and containing mineral water therein, a detachable upper cover 200 coupled to a upper portion of the container body 100 as a detachable form to seal, and provided with a water supply hole 201 supplying mineral water therethrough and an oxygen discharge hole 202 and a level sensor 203 controlling to maintain a constant level of mineral water all the time by measuring a level of mineral water supplied to the container body 100, and a lower body 300 coupled to a lower portion of the container body 100 to seal, provided with a positive electrode plate 302 disposed on a diaphragm 301 and a negative electrode plate 303 disposed below the diaphragm 301 separately, and provided with a hydrogen discharge hole 304 in one side thereof.

The most characteristic feature is that the filter mounting portion 210 provided with the through hole 210a is integrally provided in the oxygen discharge opening, which communicates with the oxygen discharge hole 202, of the detachable upper cover 200 sealing the upper part of the container body 100. An ozone removal filter 230 is seated in the filter mounting portion 210 and a cap body 220 covers an upper portion of the filter mounting portion 210 such that the ozone removal filter 230 is provided in the water electrolytic cell 10.

Figure 6:
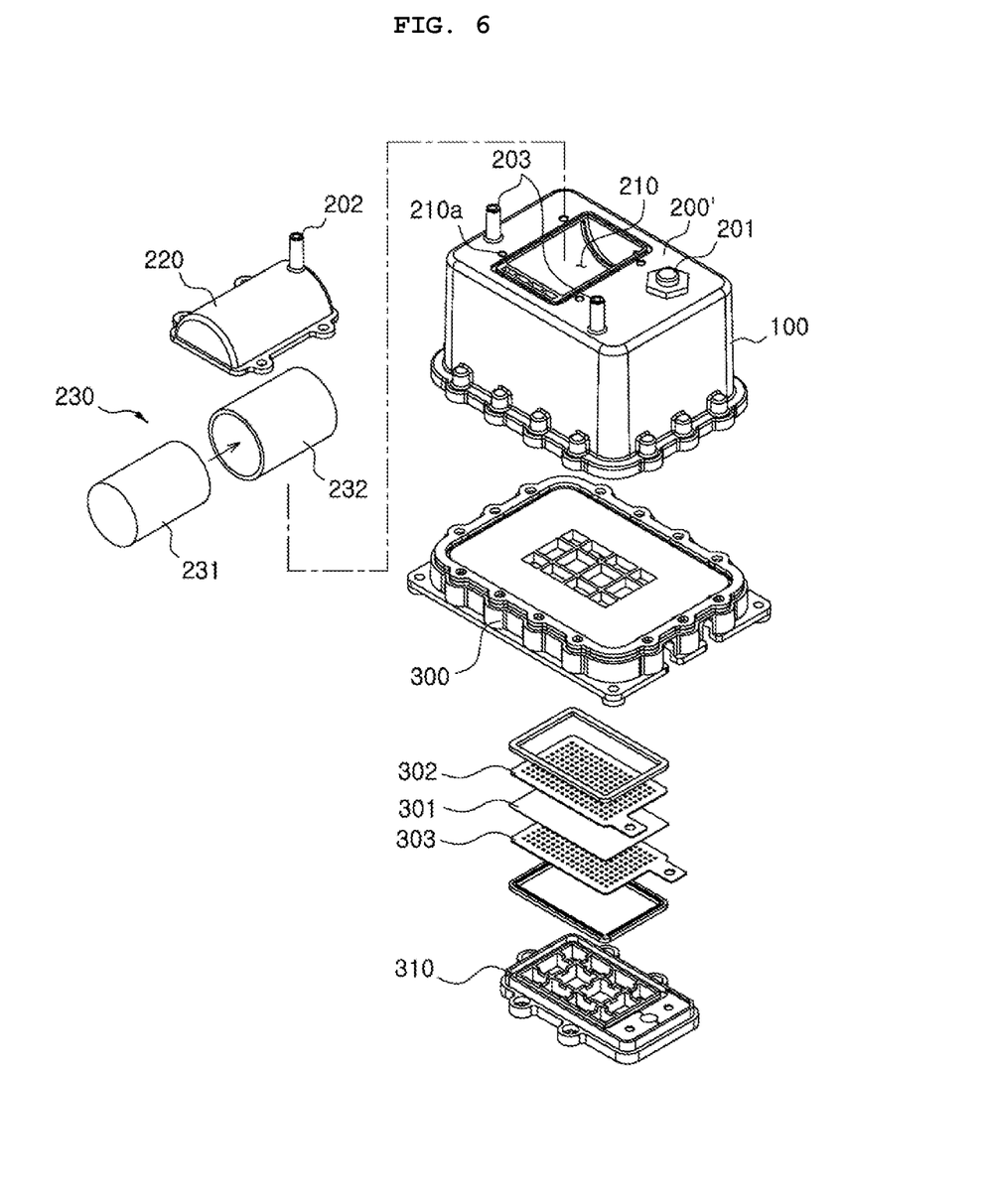
FIG. 6 is an overall exploded perspective view.
Figure 7:
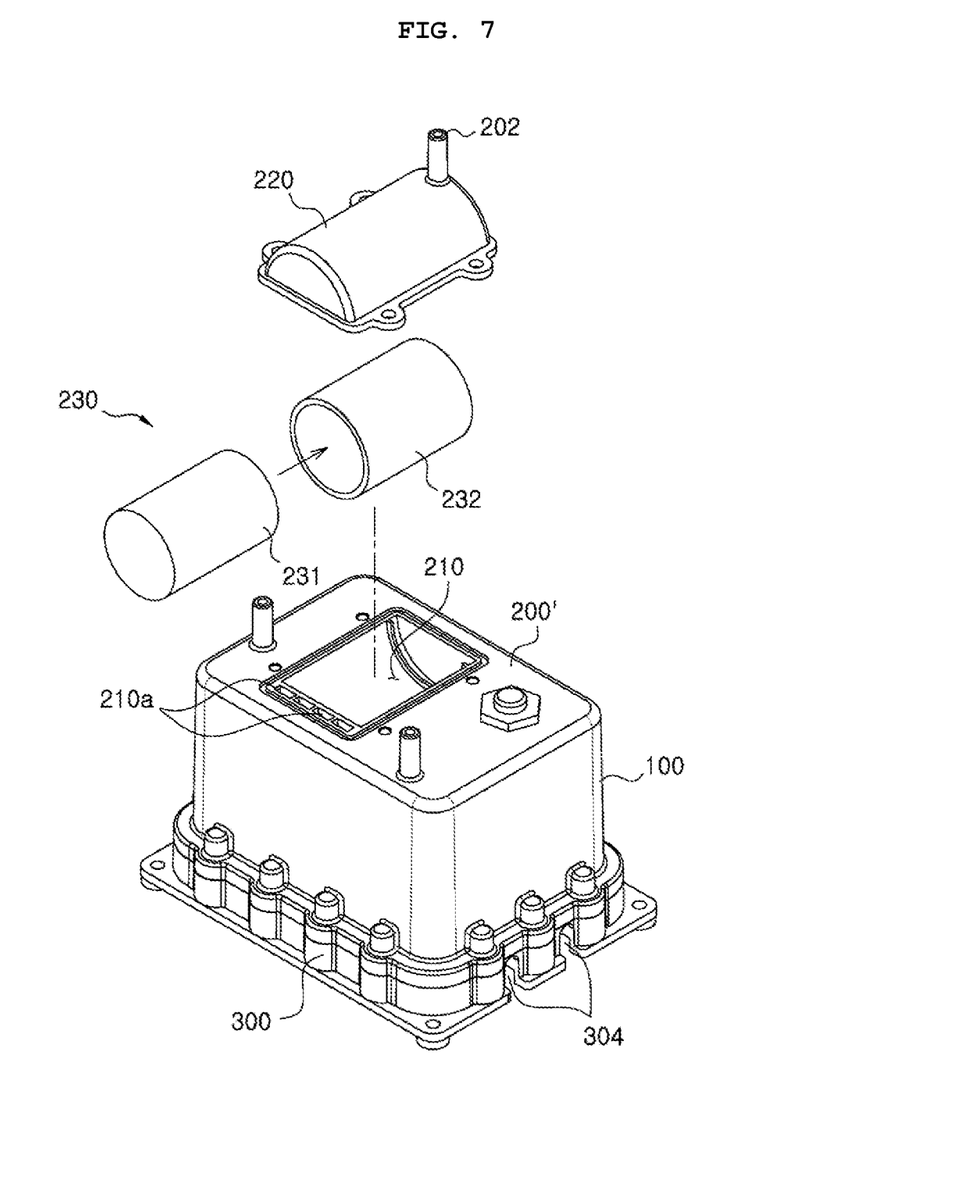
FIG. 7 is an exploded perspective view of an essential part.
Figure 8:
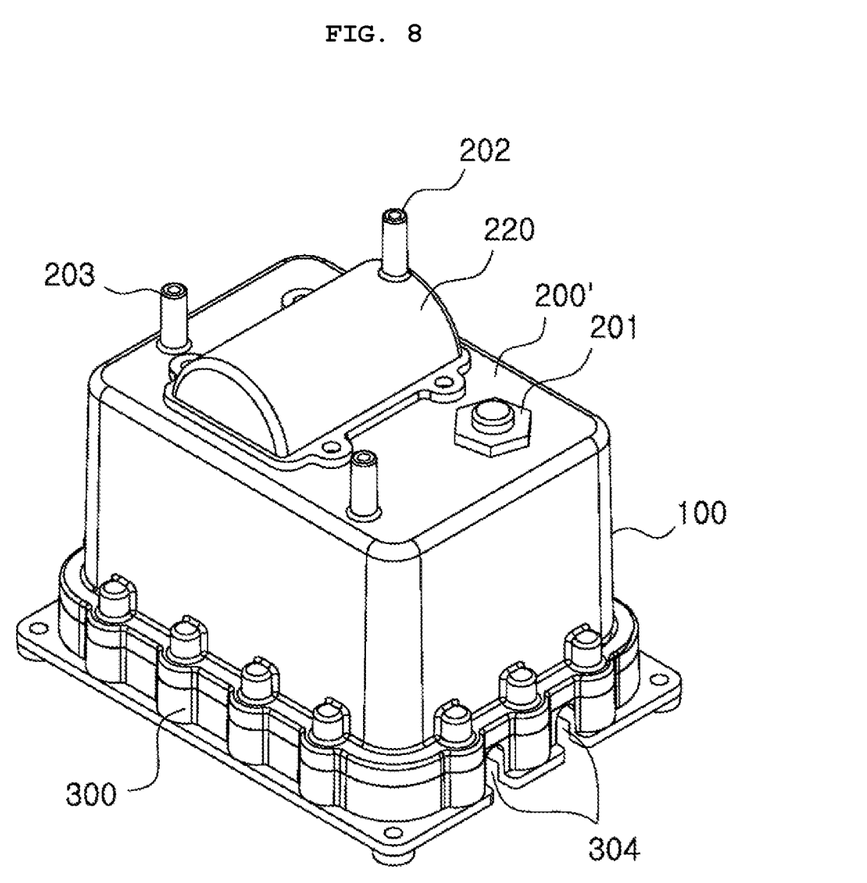
FIG. 8 is an assembled perspective view.
Figure 9:
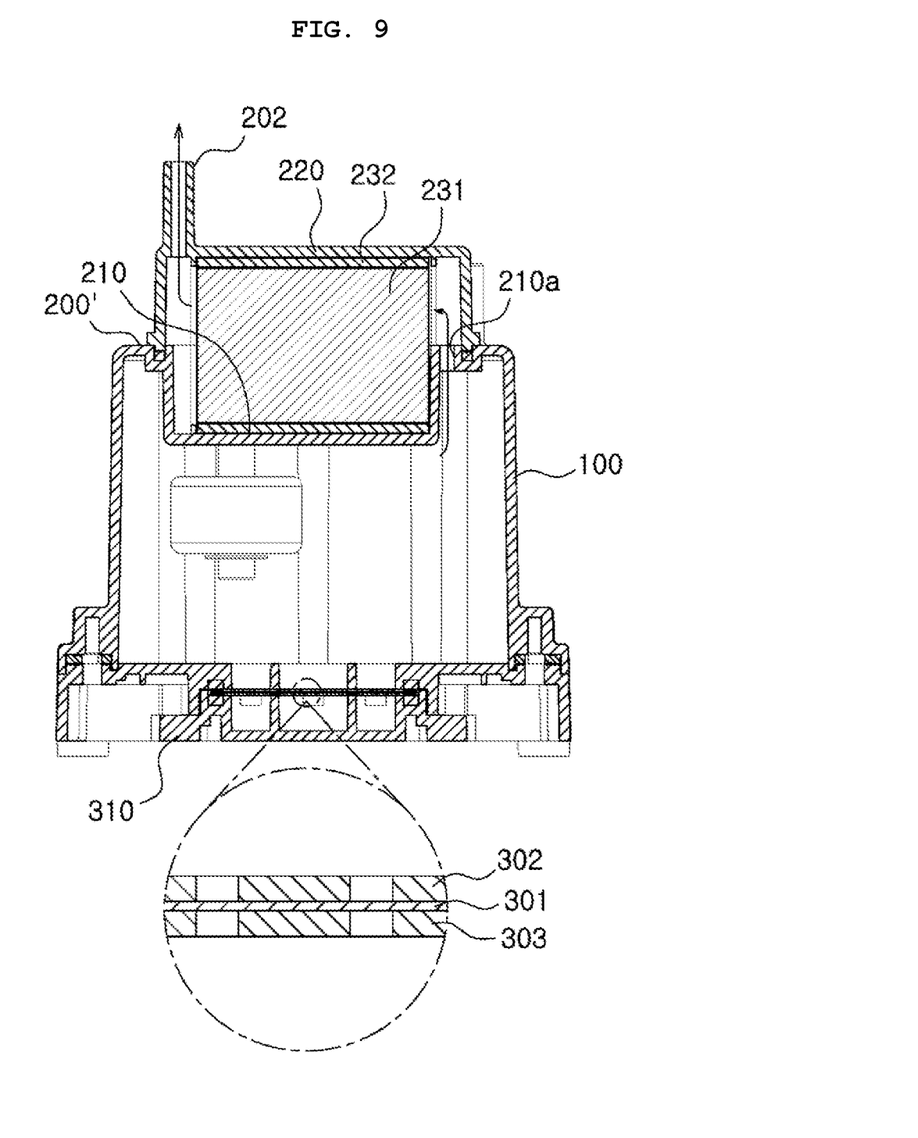
FIG. 9 is an exemplary front sectional view.
Figure 10:
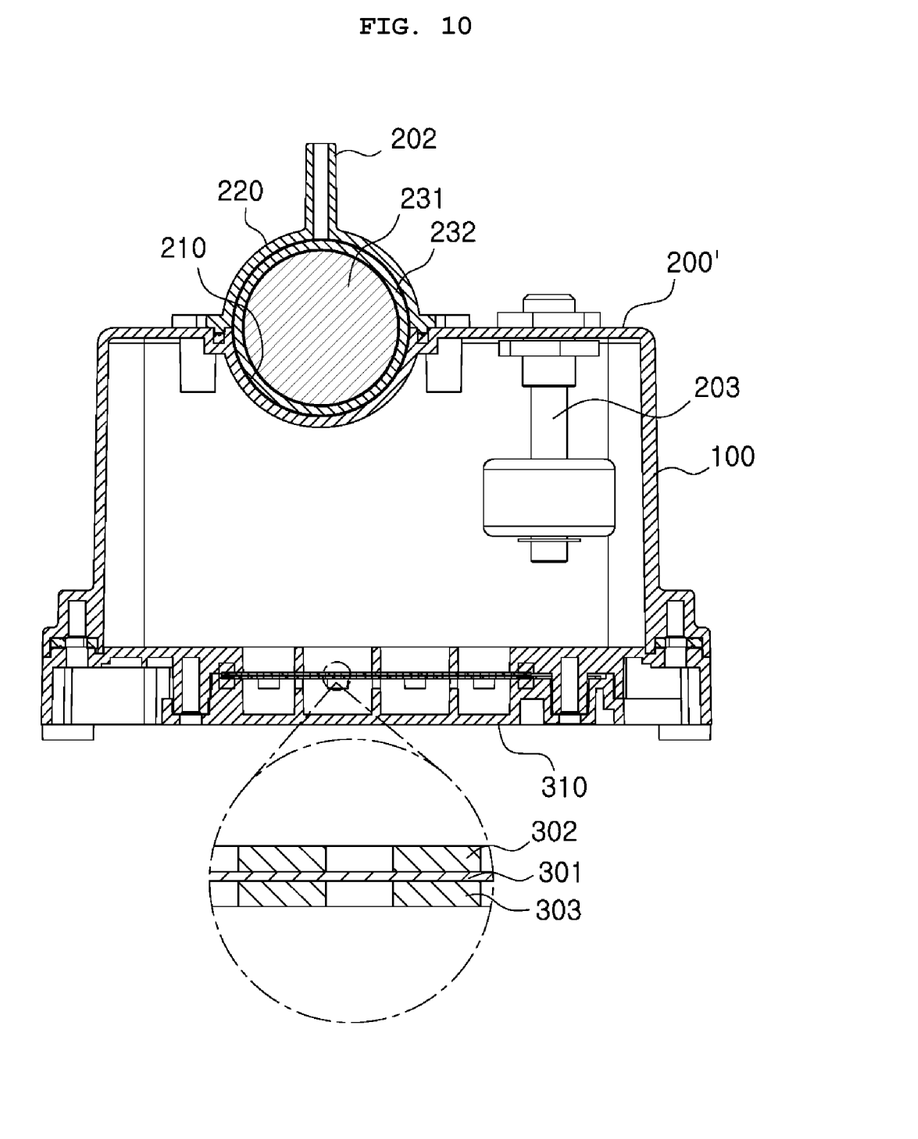
FIG. 10 is an exemplary side sectional view.

As shown in FIGS. 6 to 10, an oxygen generator integrated with the ozone removal filter according to another embodiment of the present invention roughly includes a container body 100 provided in a form of a container and provided with an integrated upper cover 200', which is provided with a water supply hole 201 supplying mineral water therethrough and an oxygen discharge hole 202 and a level sensor 203 controlling to maintain a constant level of mineral water all the time by measuring a level of mineral water supplied to the container body 100, and a lower body 300 coupled to a lower portion of the container body 100 to seal, provided with a positive electrode plate 302 disposed on a diaphragm 301 and a negative electrode plate 303 disposed below the diaphragm 301 separately by using a separate electrode plate connecting structure 310, and provided with a hydrogen discharge hole 304 in one side thereof.

That is, differences between the first embodiment and the second embodiment are that the upper cover 200' provided with the water supply hole 201 supplying mineral water therethrough, the oxygen discharge hole 202, and the level sensor 203 controlling to maintain the constant level of mineral water all the time by measuring the level of mineral water supplied to the container body 100 is integrally formed on the upper portion of the container body 100 provided with the container shape, and the positive electrode plate 302 is disposed on a diaphragm 301 and the negative electrode plate 303 is disposed below the diaphragm 301 separately at the lower portion of the lower body 300 coupled to the lower portion of the container body 100 by using the separate electrode plate connecting structure 310.

However, the second embodiment of the present invention has same characteristic feature of the first embodiment, in which the filter mounting portion 210 provided with the through hole 210a is integrally formed at the integrated upper cover 200' sealing the upper part of the container body 100 at a position corresponding to the oxygen discharge hole 202 communicating with the oxygen discharge opening of the detachable upper cover 200, the ozone removal filter 230 is seated in the filter mounting portion 210, and a cap body 220 covers the upper portion of the filter mounting portion 210 such that the ozone removal filter 230 is provided in the water electrolytic cell 10.

Meanwhile, the level sensor 203 shown in the first and second embodiments of the present invention may be chosen from various sensors, but a float sensor is used in the present invention for a compact size of entire volume of the water electrolytic cell 10.

Meanwhile, the ozone removal filter 230 seated in the filter mounting portion 210 may be selected from the group consisting of a carbon block filter 231, activated carbon particles, and an activated carbon nonwoven fabric in which an active carbon is attached to a nonwoven fabric. Any appropriate ozone removal filter 230 fitted to a shape of the filter mounting portion 210 may be used.

Reference numeral 232 in the drawings denotes a silicon film covering the carbon block filter 231.

Hereinbelow, an operational state of the oxygen generator integrated with the ozone removal filter of the present invention will be described.

The oxygen generator of the present invention supplies mineral water to the water electrolytic cell 10 through the water supply hole 201 while supplying power and applying DC voltage to the positive electrode plate 302 and the negative electrode plate 303. Various organic and inorganic materials such as calcium (Ca), Magnesium (Mg), and silicon (Si), etc. act as electrolytes. Oxygen and small amount of ozone are generated from the positive electrode plate 302 disposed on the diaphragm 301, and hydrogen is generated from the negative electrode plate 303 disposed below the diaphraym 301.

The generated oxygen and ozone pass through water in the container body 100 and are gathered at the upper portion of the water electrolytic cell. When a certain pressure is generated, oxygen and ozone are introduced into the filter mounting portion 210 through the through hole 210a of the detachable upper cover 200 or the integrated upper cover 200'. Since the silicon film 232 tightly seals a gap between the filter mounting portion 210 and the ozone removal filter 230, ozone and ozone compounds, in which ozone is combined with various organic and inorganic materials contained in mineral water, such as calcium (Ca), magnesium (Mg), silicon (Si), etc, are filtered through the ozone removal filter 230 as passing through only pores of the carbon block filter 231, the activated carbon particles, or the activated carbon nonwoven fabric in which the active carbon is attached to the nonwoven fabric, one of which constitutes the ozone removal filter 230 disposed inside the filter mounting portion 210. Accordingly, only pure oxygen passes through and is discharged through the oxygen discharge hole.

In addition, hydrogen generated from the negative electrode plate 303 is discharged through the hydrogen discharge hole 304, becomes water by combining with oxygen in the air, and evaporates into the air.

Meanwhile, ozone filtered by the ozone removal filter 230 decomposes to oxygen after 15 minutes to 30 minutes which is a half-life of ozone in water, so there is no secondary contamination or residue which means the filter is environmentally friendly.

At this point, the ozone compounds are also removed neatly during decomposition of ozone.

Although the preferred embodiment of the present invention have been disclosed for illustrative purposes, those skilled in the art will appreciate that various modifications, additions and substitutions are possible, without departing from the scope and spirit of the invention as disclosed in the accompanying claims. It is thus well known to those skilled in that art that the present invention is not limited to the embodiment disclosed in the detailed description, and the patent right of the present invention should be defined by the scope and spirit of the invention as disclosed in the accompanying claims.

INDUSTRIAL APPLICABILITY

The oxygen generator integrated with the ozone removal filter of the present invention produces oxygen by electrolyzing mineral water without using an electrolyte, additives or the like, thereby ensuring ease of use, convenient operation, no noise generation, high efficiency, low power consumption, compact appearance, and safe and easy management due to nonuse of an electrolyte such as alkali.

In addition, since a separate external filter is not necessary to be provided, the configuration is simple and the product is capable of being further miniaturized.

In addition, the filter mounting portion is integrally formed at the oxygen discharge hole provided on the upper cover of the electrolytic cell and the ozone removal filter is mounted thereto, thereby efficiently filtering ozone generated with oxygen during electrolysis of the supplied mineral water and the ozone compounds, in which ozone is combined with various organic and inorganic materials contained in the mineral water such as calcium (Ca), magnesium (Mg), and silicon (Si), etc., by the ozone removal filter so as to supply high purity oxygen in a hygienic manner.

Therefore, not only it is possible to produce high purity oxygen safely, but also it can be utilized widely for various purposes such as in drinking water containing oxygen and the like so that it can be widely utilized in the food and beverage industry.

The invention claimed is:

1. An oxygen generator integrated with an ozone removal filter, the oxygen generator being configured to generate oxygen by electrolysis of water and comprising:
    a water electrolytic cell having a detachable or integrated upper cover and having an oxygen discharge opening;
    a filter mounting portion integrally recessed in the oxygen discharge opening of the detachable or integrated upper cover of the water electrolytic cell, the filter mounting portion further including a through hole;
    an ozone removal filter seated in the filter mounting portion, the ozone removal filter being selected from the group consisting of a carbon block filter, activated carbon particles, and an activated carbon nonwoven fabric in which an active carbon is attached to a nonwoven fabric, and wherein the ozone removal filter is covered with a silicon film; and
    a cap body having an oxygen discharge hole and covering the filter mounting portion to seal the ozone removal filter to thereby mount the ozone removal filter in the filter mounting portion,
    wherein ozone and ozone compounds generated with oxygen during electrolysis of water supplied into the water electrolytic cell through a water supply hole to be filtered, and then discharged through the oxygen discharge hole provided at the cap body covering the upper portion of the filter mounting portion.

* * * * *